United States Patent
Nelson

(10) Patent No.: US 6,488,584 B2
(45) Date of Patent: Dec. 3, 2002

(54) APPARATUS AND METHOD FOR PROVIDING KEYBOARD INPUT TO A VIDEO GAME CONSOLE

(75) Inventor: Eric John Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,818

(22) Filed: Jul. 28, 1999

(65) Prior Publication Data

US 2002/0039922 A1 Apr. 4, 2002

(51) Int. Cl.$^7$ ................................................ A63F 9/24
(52) U.S. Cl. ............................................. 463/37; 463/1
(58) Field of Search ............................... 463/1, 36, 37, 463/38, 43, 47; 345/168, 156, 163, 701, 702; 273/148 B, 148 R; 434/45

(56) References Cited

U.S. PATENT DOCUMENTS

| | | | | |
|---|---|---|---|---|
| 4,852,031 A | * | 7/1989 | Brasington | 364/578 |
| 5,791,992 A | * | 8/1998 | Crump et al. | 463/41 |
| 5,838,307 A | * | 11/1998 | Bouton | 345/168 |
| 5,896,125 A | * | 4/1999 | Niedzwiecki | 345/168 |
| 5,898,587 A | * | 4/1999 | Bell et al. | 364/411.1 |
| 6,071,194 A | * | 6/2000 | Sanderson et al. | 463/37 |
| 6,171,187 B1 | * | 1/2001 | Audebert et al. | 463/37 |

FOREIGN PATENT DOCUMENTS

| | | | | |
|---|---|---|---|---|
| GB | 2057825 A | | 4/1981 | |
| JP | 06351068 | | 12/1994 | H04Q/9/00 |
| JP | 09009371 | | 1/1997 | H04Q/9/00 |
| WO | WO8403375 A1 | | 8/1984 | |

OTHER PUBLICATIONS

Microprose Entertainment Software, Inc. "F–117A Nighthawk Stealth Fighter 2.0", pp. 11–12, 1993.*

* cited by examiner

*Primary Examiner*—Joe H. Cheng
*Assistant Examiner*—K. Nguyen
(74) *Attorney, Agent, or Firm*—Martin & Associates, LLC; Derek P. Martin

(57) ABSTRACT

An apparatus and method allow a user to input alphanumeric information into a video game console by providing a keyboard that may be connected to the video game console. In a first embodiment, the keyboard plugs directly into a video game controller input on the video game console, and generates from the keystrokes on the keyboard video control codes that are compatible with the video game controller input. The video game controller recognizes the video control codes from the keyboard, and interprets the video control codes on the video game controller input as corresponding to keys on the keyboard according to a predefined map. In a second embodiment, an adapter is provided with an output that plugs into the video game controller input on the video game console, and with an input that receives a standard plug from a standard keyboard (such as a PC-compatible keyboard). The adapter receives the scan codes from the keyboard, and translates those scan codes into corresponding video control codes on the video game controller input. Using the present invention, a user may provide keyboard input to a video game console, which is especially useful in browsing information via the Internet.

11 Claims, 6 Drawing Sheets

| Joystick Position | Button(s) | Alphanumeric Character |
|---|---|---|
| Upper Left | A | a |
| Upper Center | A | b |
| Upper Right | A | c |
| Center Left | A | d |
| Center | A | e |
| Center Right | A | f |
| Lower Left | A | g |
| Lower Center | A | h |
| Lower Right | A | i |
| Upper Left | B | j |
| Upper Center | B | k |
| Upper Right | B | l |
| Center Left | B | m |
| Center | B | n |
| Center Right | B | o |
| Lower Left | B | p |
| Lower Center | B | q |
| Lower Right | B | r |
| Upper Left | A+B | s |
| Upper Center | A+B | t |
| Upper Right | A+B | u |
| Center Left | A+B | v |
| Center | A+B | w |
| Center Right | A+B | x |
| Lower Left | A+B | y |
| Lower Center | A+B | z |
| Lower Right | A+B | 0 |
| Upper Left | C up | 1 |
| Upper Center | C up | 2 |
| Upper Right | C up | 3 |
| Center Left | C up | 4 |
| Center | C up | 5 |
| Center Right | C up | 6 |
| Lower Left | C up | 7 |
| Lower Center | C up | 8 |
| Lower Right | C up | 9 |

FIG. 7

| Joystick Position | Button(s) | Alphanumeric Character |
|---|---|---|
| Upper Left | C down | - |
| Upper Center | C down | = |
| Upper Right | C down | ` |
| Center Left | C down | Backspace |
| Center | C down | Insert |
| Center Right | C down | Delete |
| Lower Left | C down | Home |
| Lower Center | C down | End |
| Lower Right | C down | Page Up |
| Upper Left | C right | Page Down |
| Upper Center | C right | Escape |
| Upper Right | C right | F1 |
| Center Left | C right | F2 |
| Center | C right | F3 |
| Center Right | C right | F4 |
| Lower Left | C right | F5 |
| Lower Center | C right | F6 |
| Lower Right | C right | F7 |
| Upper Left | C left | F8 |
| Upper Center | C left | F9 |
| Upper Right | C left | F10 |
| Center Left | C left | F11 |
| Center | C left | F12 |
| Center Right | C left | Print Screen |
| Lower Left | C left | Scroll Lock |
| Lower Center | C left | Pause |
| Lower Right | C left | Tab |
| Upper Left | Z | [ |
| Upper Center | Z | ] |
| Upper Right | Z | \ |
| Center Left | Z | ; |
| Center | Z | ' |
| Center Right | Z | , |
| Lower Left | Z | . |
| Lower Center | Z | / |

FIG. 8

| Joystick Position | Button(s) | Alphanumeric Character |
|---|---|---|
| Upper Left | Z+A+B | Up Arrow |
| Upper Center | Z+A+B | Down Arrow |
| Upper Right | Z+A+B | Left Arrow |
| Center Left | Z+A+B | Right Arrow |
| Center | Z+A+B | Num Lock |
| Center Right | Z+A+B | Caps Lock |

FIG. 9

| Button(s) | Modifier Key |
|---|---|
| L | Shift |
| R | Ctrl |
| D-pad UP | Alt |

FIG. 10

APPARATUS AND METHOD FOR PROVIDING KEYBOARD INPUT TO A VIDEO GAME CONSOLE

BACKGROUND OF THE INVENTION

1. Technical Field

The present invention relates in general to the video game field. More specifically, the present invention relates to the field of providing input to a video game console.

2. Background Art

Video games have become extremely popular since they were first introduced. Advances in technology have resulted in video game consoles that may be connected to a television to provide a wide array of different video games. Most video game consoles have a slot for receiving a video game cartridge. A user places a game cartridge into the slot in the console, and can then play the video game by viewing a display (typically on the television) and by providing input via a variety of different input devices. Popular video game consoles include Nintendo 64, Sega Genesis, and Sony PlayStation. Each of these products are protected with various trademarks that belong to their respective manufacturers, and no connection between the inventor and these manufacturers should be inferred. Known input devices to a video game console include control pads, joysticks, guns, steering wheels, gloves with sensors to detect motion of the hand and fingers, and foot switches. Video games provide hours of enjoyment for millions of users throughout the world.

Another popular activity for both business and pleasure is accessing information on the Internet. The widespread acceptance and use of the Internet and the growing number of sites have made using the Internet valuable to many users. The most common way to access the Internet is through a computer system, such as a Personal Computer (PC). A user typically interacts with a web browser program, such as Netscape Navigator or Internet Explorer, using a keyboard and a pointing device (such as a mouse or trackball) to access information via the Internet.

Recent efforts have been made to integrate televisions with computer systems. One example of this integration is WebTV, which is a television set that allows a user to access the Internet using the TV controls and display. WebTV also supports the use of an optional wireless keyboard for accessing the Internet.

Other recent efforts have attempted to provide low-cost network computers for accessing the Internet. These network computers typically have no hard disk drive, and store and retrieve most needed information from a web site via the Internet. While these computer systems allow accessing the Internet via low cost computers, many computer users feel constrained by the limited capabilities of these computers.

While video game consoles have become increasingly powerful, they are still limited to playing games. If a person could access the Internet via a video game console, this would reduce or eliminate the need for a separate computer system or a special television to access the Internet. However, accessing information via the Internet generally requires the entry of alphanumeric information by a user. There is currently no convenient way to input alphanumeric information into a video game console. Without a way for users to easily input alphanumeric information to a video game console, users will be unable to use their video game consoles to access the Internet.

DISCLOSURE OF INVENTION

According to the present invention, an apparatus and method allow a user to input alphanumeric information into a video game console by providing a keyboard that may be connected to the video game console. In a first embodiment, the keyboard plugs directly into a video game controller input on the video game console, and generates from the keystrokes on the keyboard video control codes that are compatible with the video game controller input. The video game controller recognizes the video control codes from the keyboard, and interprets the video control codes on the video game controller input as corresponding to keys on the keyboard according to a predefined map. In a second embodiment, an adapter is provided with an output that plugs into the video game controller input on the video game console, and with an input that receives a standard plug from a standard keyboard (such as a PC-compatible keyboard). The adapter receives the scan codes from the keyboard, and translates those scan codes into corresponding video control codes on the video game controller input. Using the present invention, a user may provide keyboard input to a video game console, which is especially useful in browsing information via the Internet.

The foregoing and other features and advantages of the invention will be apparent from the following more particular description of preferred embodiments of the invention, as illustrated in the accompanying drawings.

BRIEF DESCRIPTION OF DRAWINGS

FIGS. 7–9 are tables that each define a suitable mapping from video control codes to corresponding alphanumeric characters on a keyboard; and FIG. 10 is a table that defines a suitable mapping from video control codes to modifier keys on a keyboard.

BEST MODE FOR CARRYING OUT THE INVENTION

According to preferred embodiments of the present invention, an apparatus and method allow a keyboard to be connected to a video game console so that alphanumeric text can be entered into the video game console. This is especially useful in the context of web browsing via the apparatus and method of the present invention.

Figure 1:
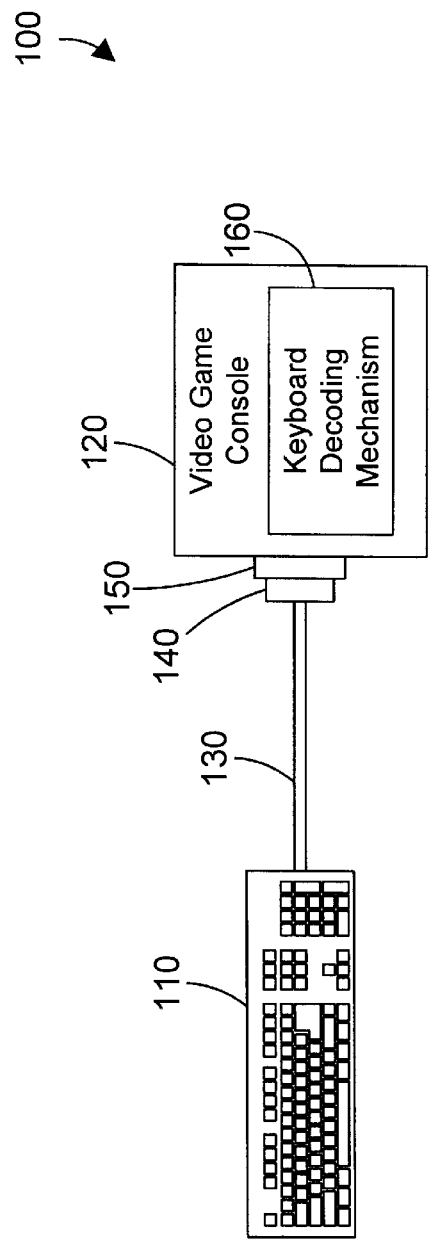
FIG. 1 is a block diagram of a keyboard apparatus in accordance with a first embodiment of the present invention that connects directly to a video game controller input on a video game console.

Referring to FIG. 1, an apparatus 100 in accordance with a first embodiment includes a keyboard 110 connected to a video game console 120. Video game console 120 includes a video controller receptacle 150. Keyboard 130 includes a cable 130 connected to a video controller plug 140 that is adapted to fit within the video controller receptacle 150 on the video game console 120. Keyboard 110 produces a unique output for each predefined key and key combination, with each output comprising a valid input to video game console 120. The video game console 120 includes a keyboard decoding mechanism 160 that decodes the received video control code and determines which alphanumeric key or key combination corresponds to the received video control code.

Figure 2:
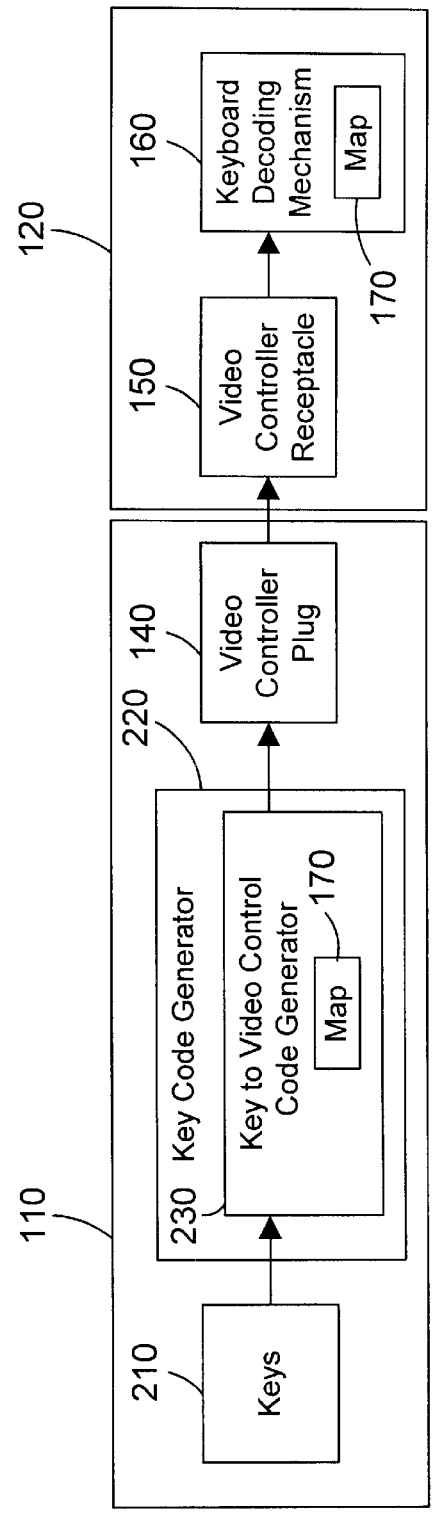
FIG. 2 is a block diagram showing the flow of information through the keyboard and the video console of FIG. 1.

The flow of information between keyboard 110 and video game console 120 is shown in FIG. 2. Keys 210 represent the keys on a keyboard, which are preferably momentary single-pole double-throw switches arranged in a matrix. Note that multiple keys may be pressed to generate a single alphanumeric character, such as pressing the "shift" and "A" keys simultaneously to provide an upper case letter A. The output from the keys 210 is monitored by a key code generator 220, which includes a key to video control code generator 230 that performs the conversion between the key or keys pressed and corresponding video control codes according to the information in a map 170. Each defined key and key combination on keyboard 110 is mapped to a corresponding video control code using map 170. This same map is used to decode the received video control codes to determine which alphanumeric character corresponds to a received video control code, as shown by map 170 in the keyboard decoding mechanism 160. The mapping of keys and key combinations to specific video control codes can be done in any suitable fashion, so long as the encoding in the keyboard 110 and the decoding in the video game console 120 use the same map 170.

The video control code corresponding to a pressed key or key combination is output from key code generator 220 to video controller plug 140, which is connected to the video controller receptacle 150 in the video game console 120, which provides input to the keyboard decoding mechanism 160. Keyboard decoding mechanism 160 determines from map 170 which key corresponds to the received video control code to determine which key or key combination was pressed on the keyboard 110.

Figure 3:
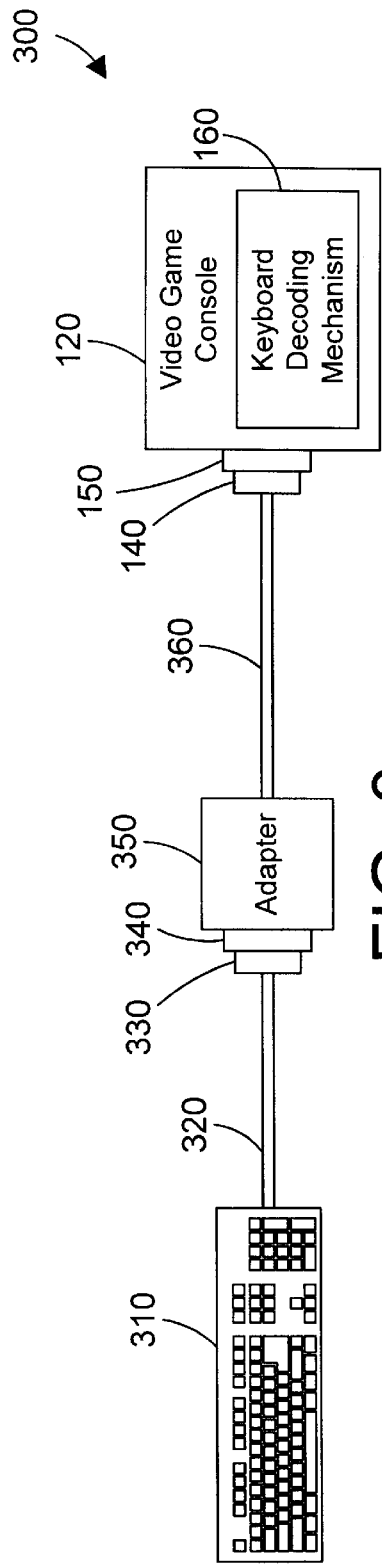
FIG. 3 is a block diagram of an apparatus in accordance with a second embodiment of the present invention that has an adapter with an output connected directly to the video game controller input on a video game console and that has an input that receives a standard keyboard connector from a standard keyboard.
Figure 4:
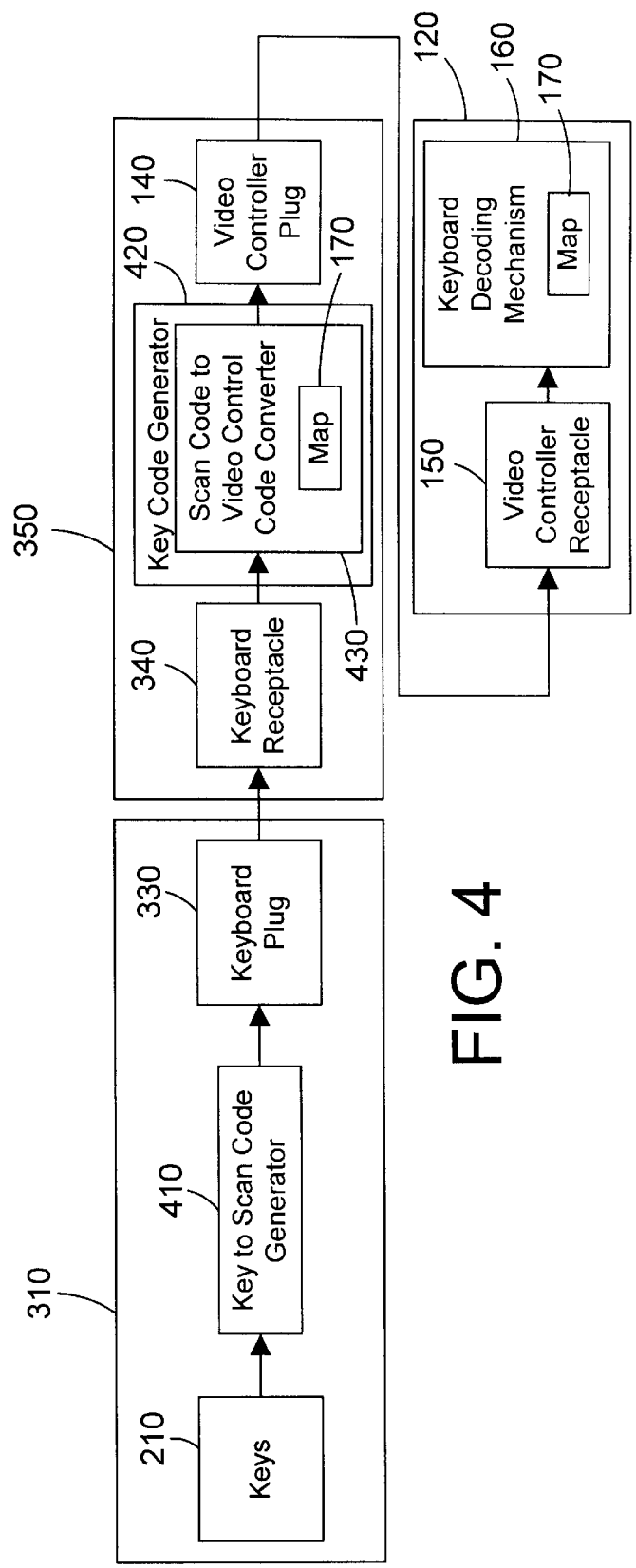
FIG. 4 is a block diagram showing the flow of information through the keyboard, adapter, and video console of FIG. 3.

Referring now to FIGS. 3 and 4, an apparatus in accordance with a second embodiment of the invention includes a keyboard 310 coupled through an adapter 350 to a video game console 120. Keyboard 310 is preferably an existing keyboard that produces "scan codes" that correspond to the predefined key and key combinations on the keyboard 310. The concept of scan codes for keyboards is well-known in the art. For a description of scan codes for an IBM-compatible AT keyboard, see Sargent, M. III et al., "The IBM PC from the Inside Out", p. 277–279 (Addison-Wesley 1988). Keyboard 310 includes a cable 320 and a keyboard plug 330. One suitable example of a keyboard 310 is an IBM-compatible keyboard used for personal computers (PCs). Of course, other keyboards may also be used. The second embodiment expressly extends to any keyboard that produces a scan code for its defined keys and key combinations.

Video game console 120 is the same as in the first embodiment, and includes keyboard decoding mechanism 160. Adapter 350 is provided to convert the scan codes from a standard keyboard into video control codes that video game console 120 can recognize. Adapter 350 includes a keyboard receptacle 340 that receives the keyboard plug 330, and an output cable 360 connected to a video controller plug 140 that plugs into a corresponding video controller receptacle 150 on the video game console 120.

Referring to FIG. 4, the scan codes received from the keyboard 310 via the keyboard receptacle 340 are processed by key code generator 420, which includes a scan code to video control code converter 430. This converter 430 includes a map 170 that correlates the predefined keys and key combinations of keyboard 310 to corresponding video control codes that are recognized by video game console 120. The corresponding video control code is output to the video controller plug 140, which is connected to the video controller receptacle 150 in the video game console 120, which provides input to the keyboard decoding mechanism 160. Keyboard decoding mechanism 160 then converts the received video control code to its corresponding alphanumeric character using map 170.

Figure 5:
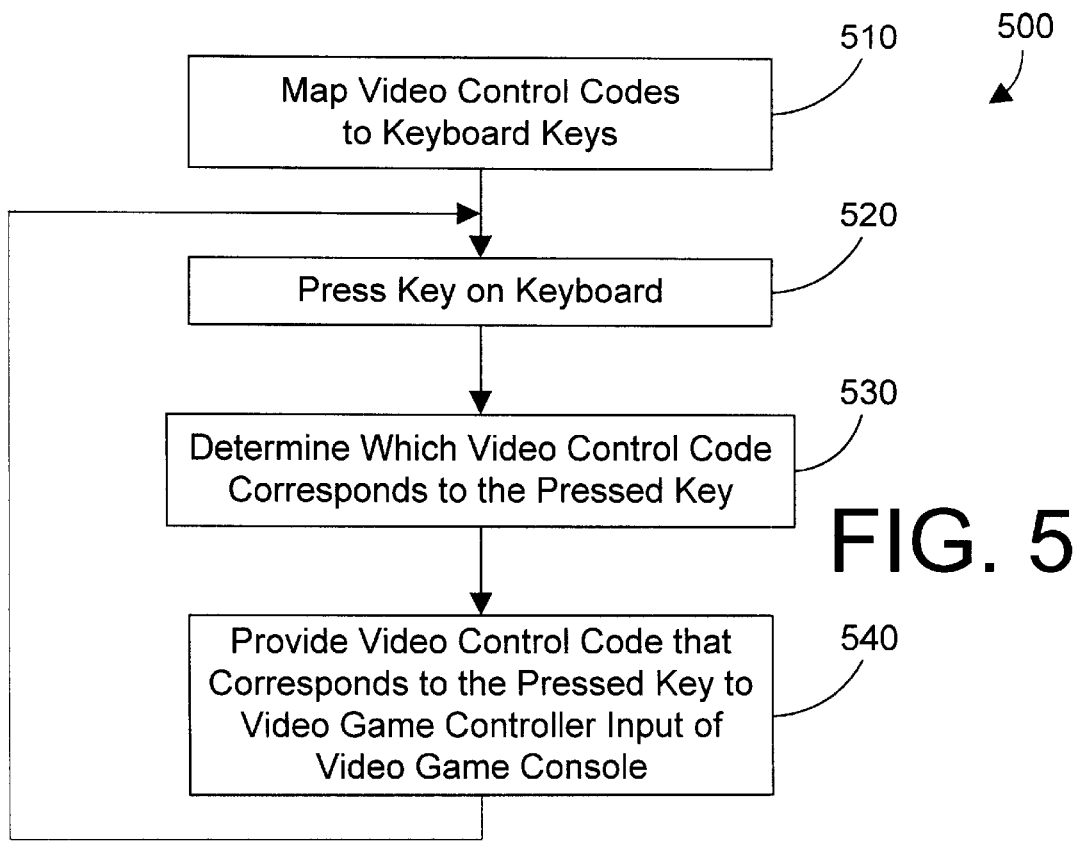
FIG. 5 is a flow diagram of a method for providing alphanumeric information to a video game console in accordance with the preferred embodiments.

Referring to FIG. 5, a method 500 for providing alphanumeric input to a video game console begins by mapping various video game control codes to keyboard keys (step 510). This mapping may be done in any suitable way, and the scope of the invention is not limited to any particular mapping scheme. Step 510 of method 500 generates map 170 shown in FIGS. 2 and 4. Once the map is defined, when a key (or key combination) on the keyboard is pressed (step 520), method 500 determines which video control code corresponds to the pressed key (step 530) by consulting the map that was created in step 510. Next, the corresponding video control code is output to the video controller input of the video game console (step 540). At this point the video game console decodes the input using the map generated in step 510 to determine which key or key combination was pressed. This process continues for each key pressed.

Figure 6:
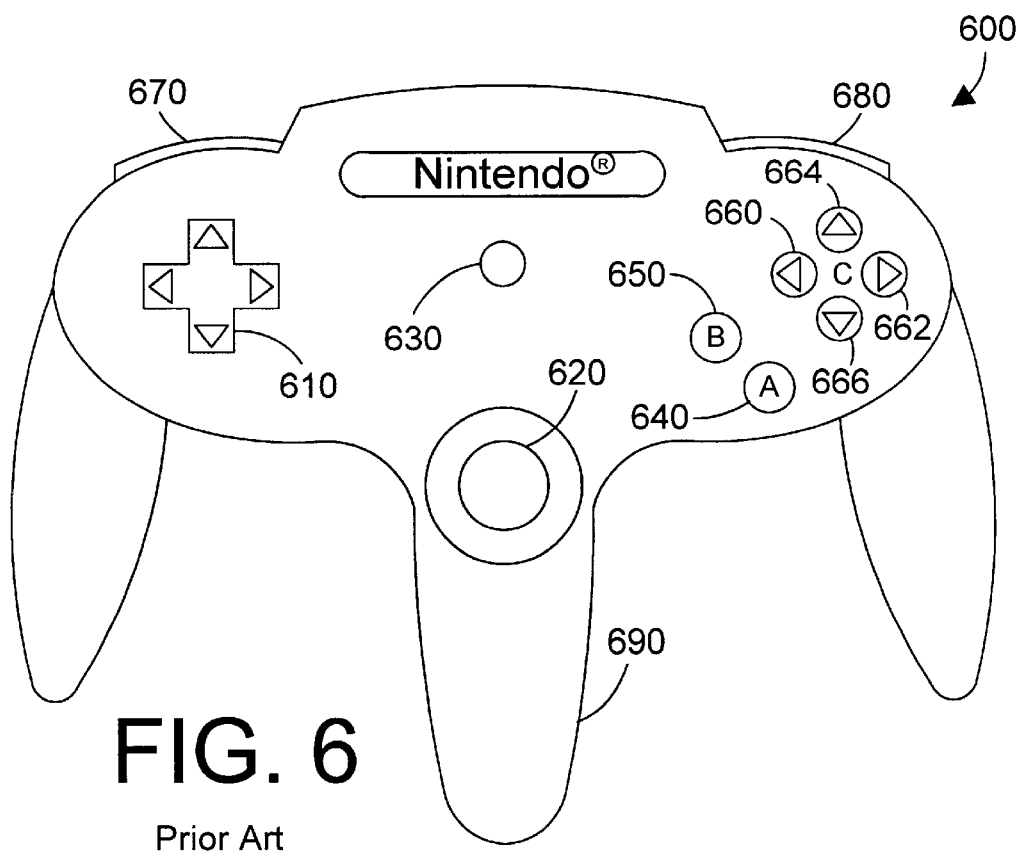
FIG. 6 is a top view of a known Nintendo 64 video game controller.

A specific example will now be presented to illustrate one suitable implementation in accordance with the preferred embodiments. We assume that we want to provide alphanumeric input via a keyboard to a Nintendo 64 video game console. In order to do this, a map must be generated that correlates inputs on a Nintendo 64 controller to defined keys and key combinations on a keyboard. Referring to FIG. 6, a controller 600 for a Nintendo 64 video console includes a directional pad 610, a joystick 620, and a variety of different buttons 630–680. Directional pad 610 has five defined positions: up, down, left, right, and center. Joystick 620 has nine defined positions: upper left, upper center, upper right, center left, center, center right, lower left, lower center, and lower right. Many known joysticks (including the joystick 620 for the Nintendo 64 controller) provide many more positions than these nine listed here. For example a joystick might actually generate coordinates that correspond to many possible positions. These types of joysticks can easily generate the nine positions above by mapping each joystick position to one of nine different quadrants that correspond to each of the nine positions. Note that the selection of nine joystick positions is arbitrary, and is selected here for the purpose of illustrating the concepts of the preferred embodiments, and should not be construed as limiting. The scope of the preferred embodiments expressly extends to any number and type of joystick positions and mappings. Some games recognize input from directional pad 610, other recognize input from joystick 620, and still others recognize input from both, and some games do not use either.

The defined buttons for a Nintendo 64 controller include a start button 630, an "A" button 640, a "B" button 650, four directional "C" buttons 660, 662, 664, and 666, a "left" button 670, and a "right" button 680. There is also a "Z" button (not shown) that is located on the back side of the controller 600 and that is actuated like a trigger when a person's hand grips the middle support 690 of controller 600. These buttons are used to generate the predefined video control codes that are input to the Nintento 64 video game console to cause certain effects when playing a game.

One suitable mapping from the control inputs on the Nintendo 64 controller 600 to an alphanumeric keypad are shown in FIGS. 7–10, which collectively comprise map 170 of FIGS. 2 and 4. In the left column of FIGS. 7–9 is the "Joystick Position", which refers to the position of joystick 620. The column labeled "Buttons(s)" in FIGS. 7–9 is a list of buttons that are pressed when the joystick is in the stated position to generate the corresponding character in the "Alphanumeric Character" column. Referring to FIG. 7, the lower case "a" is mapped to the combination of the joystick being in the upper left position and the "A" button 640 being pressed. This means that when a lower case "a" is pressed on either keyboard 110 (for the first embodiment) or keyboard 310 (for the second embodiment), the video control code that represents the joystick in the upper left position with the "A" button pressed is sent to the video controller input of the Nintendo 64 console. The console then takes this information and uses the map in FIGS. 7–10 to determine which alphanumeric character corresponds to the video control code just received. Other alphanumeric characters are mapped to corresponding video control codes as shown in FIGS. 7–10.

Note that the video game console must be placed in a mode that recognizes keyboard input in order to distinguish between game input and alphanumeric input. The selection of alphanumeric mode may be accomplished in any suitable way within the scope of the preferred embodiments. For example, the user may select a menu option that configures one or more specific controller inputs as keyboard inputs. A particular string of video control codes could cause the video console to change to alphanumeric mode. For example, when a user plugs in the keyboard (in the first embodiment) or the adapter (in the second embodiment) into the video game console, the user could then type on the keyboard a predefined string such as "TEXTMODE" that would cause the video game console to change to text mode. The mapping of alphanumeric characters and judicious selection of a particular string will minimize the likelihood that a user could inadvertently achieve the same combination of video command codes with a game controller.

Referring to FIG. 10, each of the alphanumeric characters in FIGS. 7–9 can be modified by modifier keys Shift, Ctrl, and Alt, thereby quadrupling the number of alphanumeric characters available. The "shift" modifier is applied when the "left" button 670 is pressed at the same time the joystick position and button(s) that define an alphanumeric character are pressed. The "Ctrl" modifier is applied when the "right" button 680 is pressed at the same time the joystick position and button(s) that define an alphanumeric character are pressed. The "Alt" modifier is applied when the directional pad 610 is pressed up at the same time the joystick position and button(s) that define an alphanumeric character are pressed. The specific mappings of alphanumeric characters that are modified by suitable modifiers (such as Shift, Ctrl, and Alt) are not shown herein, but any mapping of alphanumeric characters to modified keys is within the scope of the preferred embodiments.

The preferred embodiments described herein provide different apparatus and methods that allow a user to enter alphanumeric information into a video game controller using an alphanumeric keyboard. The information corresponding to the key or key combinations on the keyboard is converted to corresponding video control codes that the video game console can recognize and process according to a predefined map Using that map, the video game console can convert the received video control codes to the corresponding alphanumeric information. By providing the capability of receiving alphanumeric information via a keyboard, a video game controller could be used for more sophisticated tasks, such as accessing information via the Internet.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, once a video game console can be placed in an alphanumeric mode to recognize alphanumeric input, a user could actually use a game controller to input alphanumeric information. This task is much more difficult with a game controller when compared to a keyboard, but the present invention allows the user to enter alphanumeric information using either the keyboard or a game controller.

I claim:

1. An apparatus comprising:
   a plurality of keys on an alphanumeric keyboard;
   a key code generator coupled to the keyboard that generates a video control code for each key and key combination defined by the alphanumeric keyboard, each video control code comprising a defined input on a video game console.

2. An apparatus comprising:
   a video game console;
   a plurality of keys on an alphanumeric keyboard that is coupled to the video game console;
   a key code generator coupled to the alphanumeric keyboard and coupled to the video game console that generates a video control code output to the video game console for each key and key combination defined by the alphanumeric keyboard, each video control code comprising a defined input on the video game console.

3. The apparatus of claim 2 wherein the alphanumeric keyboard produces a scan code for each defined key and key combination, wherein the key code generator generates from the scan code a corresponding video control code.

4. The apparatus of claim 2 wherein the key code generator resides in an adapter that is coupled to the alphanumeric keyboard and to a video controller input of the video game console, the alphanumeric keyboard producing a scan code for each defined key and key combination, wherein the key code generator generates from the scan code for each defined key and key combination a corresponding video control code that is input into the video controller input of the video game console.

5. The apparatus of claim 2 wherein the video game console comprises a keyboard decoding mechanism that decodes the video control code that is received by the video controller input and determines from a map which keyboard key or key combination corresponds to the received video control code.

6. An apparatus comprising:
   a receptacle for receiving a plug on an alphanumeric keyboard;
   a video controller plug for plugging into a video controller receptacle on a video game console; and a scan code to video control code converter that converts a plurality of scan codes received from the alphanumeric keyboard corresponding to each key and key combination defined by the alphanumeric keyboard to predefined corresponding video control codes that are output to the video controller plug.

7. An apparatus comprising:

a predefined map that correlates key and key combinations defined by an alphanumeric keyboard to corresponding video control codes for a video game console;

means for determining when a defined key or a combination of keys on the alphanumeric keyboard is pressed;

means for determining which video control code corresponds to the pressed key; and means for generating the corresponding video control code on a video controller input of the video game console.

8. The apparatus of claim 7 further comprising:

means for decoding the video control code on the video controller input using the predefined map to determine which key or key combination was pressed on the alphanumeric keyboard.

9. A method for providing alphanumeric keyboard input to a video game console, the method comprising the steps of:

mapping key and key combinations defined by the alphanumeric keyboard to corresponding video control codes;

determining when a key on the alphanumeric keyboard is pressed;

determining which video control code corresponds to the pressed key; and generating the corresponding video control code on a video controller input of the video game console.

10. The method of claim 9 further comprising the step of the video game console decoding the video control code to determine which key or key combination was pressed on the alphanumeric keyboard.

11. A method for providing alphanumeric keyboard input to a video game console, the method comprising the steps of:

providing an alphanumeric keyboard that produces a scan code for each key and key combination defined by the alphanumeric keyboard;

mapping the defined key and key combinations in the alphanumeric keyboard to corresponding video control codes;

providing an adapter that generates from the scan code for each of the defined key and key combinations a corresponding video control code that is input into the video controller input of the video game console;

coupling the alphanumeric keyboard to the adapter;

coupling the video game console to the adapter;

the alphanumeric keyboard generating a scan code when a defined key or key combination on the alphanumeric keyboard is pressed;

the adapter determining which video control code corresponds to the pressed key; and the adapter generating the corresponding video control code on the video controller input of the video game console.

* * * * *